(12) United States Patent
Luffel et al.

(10) Patent No.: US 6,421,306 B1
(45) Date of Patent: Jul. 16, 2002

(54) SINGLE-SIDE ENGAGING PICKER FOR DATA CARTRIDGES

(75) Inventors: Robert W. Luffel, Greeley; Paul Coffin; Daniel R. Dauner, both of Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 1003 days.

(21) Appl. No.: 08/641,442

(22) Filed: Apr. 29, 1996

(51) Int. Cl.[7] ................................ G11B 17/22; G11B 15/68
(52) U.S. Cl. ............................................. 369/36; 360/92
(58) Field of Search .................... 369/36, 34, 191–192, 369/270, 271, 258; 360/92

(56) References Cited

U.S. PATENT DOCUMENTS

| | | | |
|---|---|---|---|
| 4,918,548 A | | 4/1990 | O'Donnell et al. ............ 360/92 |
| 4,998,232 A | * | 3/1991 | Methlie et al. ................ 369/36 |
| 5,010,536 A | * | 4/1991 | Wanger et al. ................ 369/36 |
| 5,014,255 A | | 5/1991 | Wanger et al. ................ 369/36 |
| 5,043,962 A | | 8/1991 | Wanger et al. ................ 369/36 |
| 5,101,387 A | | 3/1992 | Wanger et al. ................ 369/36 |
| 5,146,375 A | | 9/1992 | Satoh et al. ................... 360/92 |
| 5,242,259 A | | 9/1993 | Yeakley ....................... 414/751 |
| 5,363,258 A | | 11/1994 | Coles et al. ................... 360/92 |
| 5,450,391 A | * | 9/1995 | Pollard ......................... 369/36 |
| 5,456,528 A | | 10/1995 | Daiziel ....................... 312/9.46 |
| 5,659,444 A | * | 8/1997 | Dang et al. ................... 369/36 |

FOREIGN PATENT DOCUMENTS

| WO | WO95/28342 | 10/1995 |
|---|---|---|

\* cited by examiner

Primary Examiner—Allen Cao
(74) Attorney, Agent, or Firm—Augustus W. Winfield

(57) ABSTRACT

A picker for data cartridges in a computer information storage library. The picker includes a sleeve for transporting data cartridges, a thumb that can move in one dimension relative to the sleeve, and a single pivoting finger on the thumb. The single finger has an inboard pivot point which results in a self locking action (pulling makes the finger grip tighter). The finger has an armed state for gripping and a splayed state for release. Switching between states is passive, depending only on one dimensional motion of the thumb relative to the sleeve. The finger has a post that travels in tracks in the sleeve. Switching tracks switches finger states. A spring loaded gate in the tracks enables track switching. Potential cartridge wear and binding problems during extraction are eliminated by providing sleeve guides that limit cartridge rotation, by providing a concave guide surface in storage locations, and by proper selection of materials. A corresponding drive has a handle that must be manipulated. The picker includes thumb details for manipulating the drive handle.

10 Claims, 19 Drawing Sheets

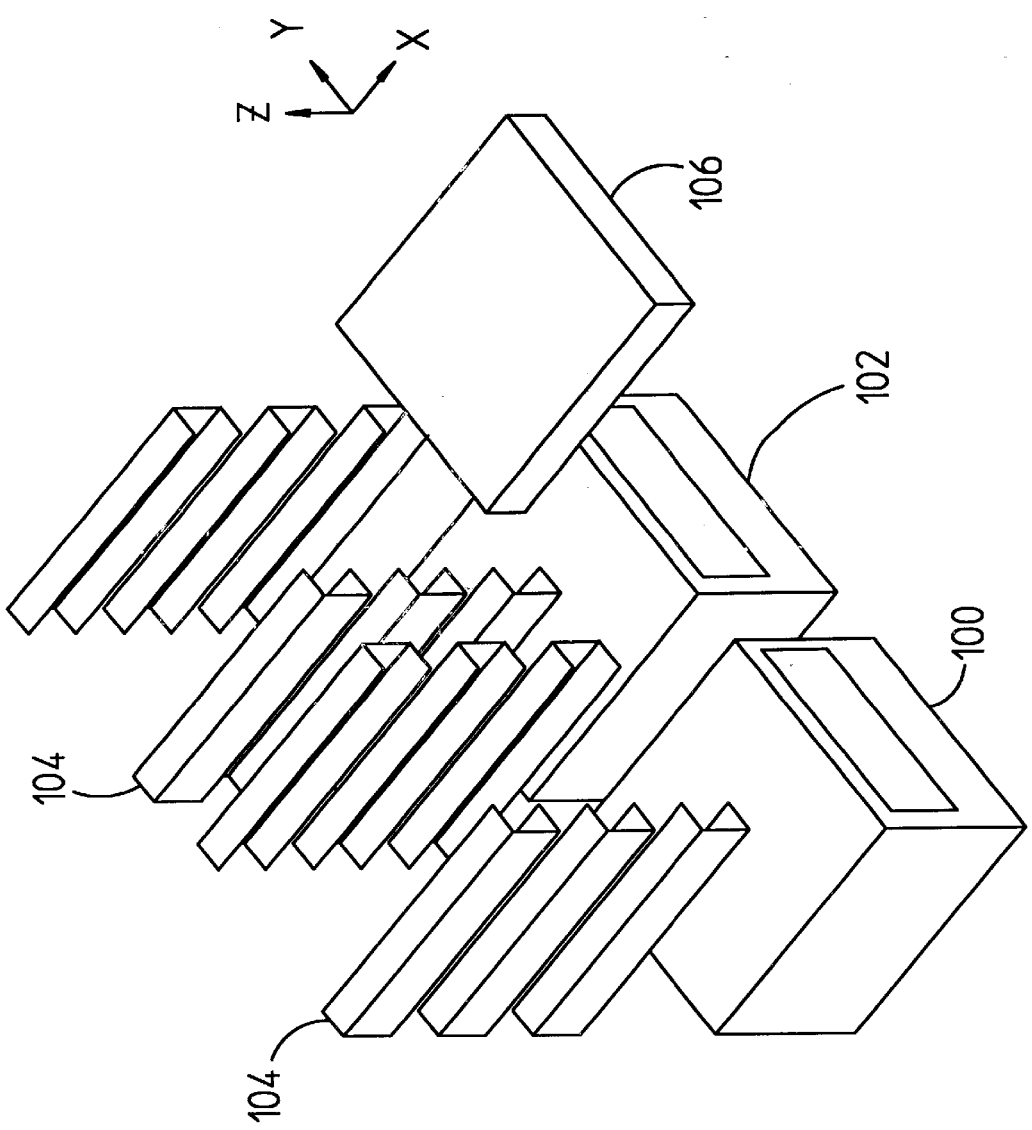

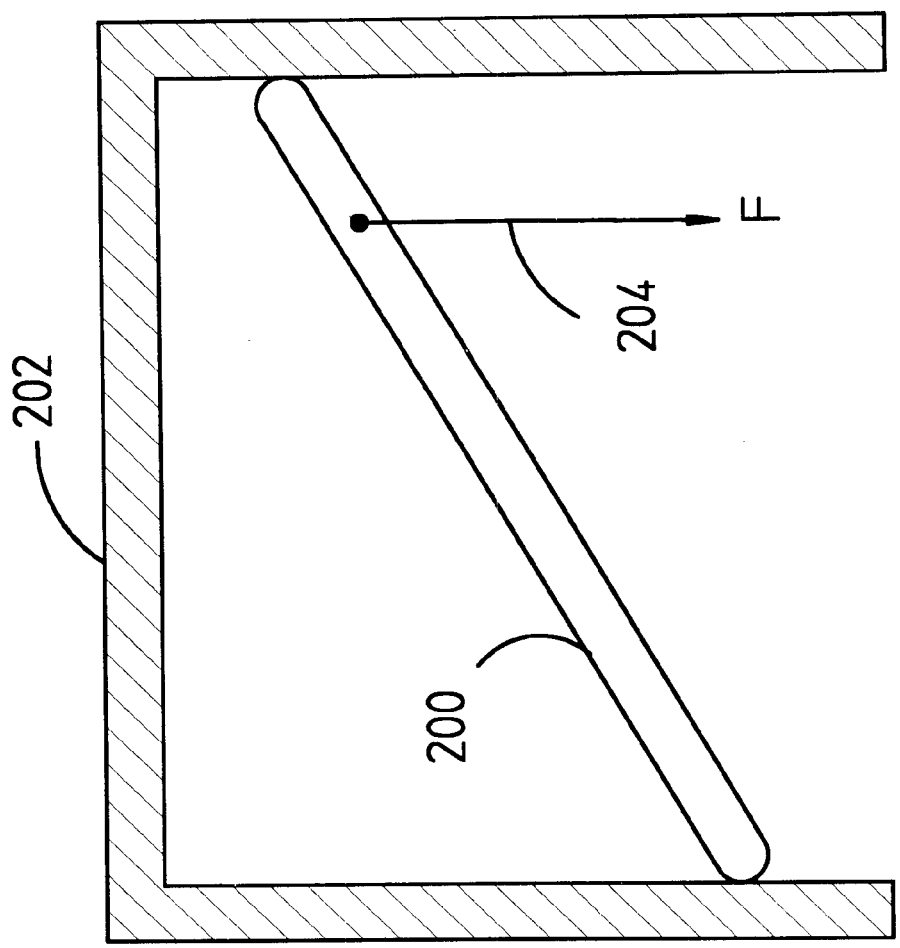

SINGLE-SIDE ENGAGING PICKER FOR DATA CARTRIDGES

FIELD OF INVENTION

This invention relates generally to robotic picker mechanisms and more specifically to a robotic picker mechanism for data cartridges for computer information storage libraries.

BACKGROUND OF THE INVENTION

A computer information storage library (also known as an autochanger) typically includes at least one information storage drive mechanism, a media storage system for computer information media or data cartridges, a picker (also called a manipulator or engagement mechanism) for inserting media or cartridges into drives or storage locations and for extracting media or cartridges from drives or storage locations, and a transport mechanism for moving the picker and media or cartridges between drives and storage. Computer information storage drives with removable media include, for example, disk drives (magnetic and optical) and magnetic tape drives. Media storage systems include, for example, carousels, cylindrical silos, and slotted magazines or racks. There is a wide spectrum of transport assemblies. For example, cartridges may be translated and rotated with four or more degrees of freedom by an anthropomorphic robot arm or cartridges may simply be translated in two dimensions. Alternatively, instead of a separate transport mechanism, the media storage system may be moveable. For example, a carousel may rotate to position a cartridge at a stationary drive. Alternatively, a drive may be moved by a transport system to a stationary cartridge location. There is also a wide spectrum of pickers. For example, friction grippers with multiple fingers may be used, various media or cartridge features may be hooked or clamped, or cartridges may be simply pushed or pulled.

Typically, data cartridges designed for robotic manipulation have catch surfaces, notches or other features on the cartridge shell to facilitate gripping or hooking. Typically, the gripping features are located symmetrically about a central axis to prevent twisting (and possibly binding) during extraction. However, some data cartridges were originally designed for manual manipulation, with no particular features intended for robotic gripping. In particular, the DLT tape cartridge, commercially available from Quantum Corporation, Milpitas, Calif., is of interest for computer information storage libraries, but has few features suitable for hooking by robotic manipulators. The DLT cartridge has a notch in one side wall that is suitable for a hook type gripper, but pulling on only one side may cause the cartridge to twist and possibly bind during extraction. Some gripping mechanisms for the DLT cartridge use friction grippers, typically gripping both cartridge sides. Compared to finger grippers that hook into notches, friction grippers may be relatively complex, leading to higher cost and lower reliability. In addition, friction grippers are sensitive to contaminants or other things affecting the coefficient of friction between the gripper and the surface being gripped.

A drive mechanism may have a latch, handle or door that must be manipulated to insert or remove a medium or cartridge. Sometimes, the drive mechanism may include an automatic powered actuator for a latch, handle or door. If the latch, handle or door is not power actuated, the library picker may need to include an additional capability for manipulating the latch, handle or door on the drive. Drive mechanisms for the DLT cartridge have a handle that is used to align the tape cartridge to reference surfaces and to engage a drive hub. The handle may optionally be power actuated or may be manipulated by a robotic picker. The power actuator adds cost, space and complexity. If multiple drives are used, additional cost, space and complexity is required for each drive. Manipulation of the handle(s) by a picker is desirable to reduce the cost, space and complexity of the library.

There is a need for a finger gripper capable of engaging a single notch on one side of a data cartridge while avoiding binding due to rotation of the data cartridge. In addition, there is a need for a picker capable of manipulating a latch, handle, or door on a drive.

SUMMARY OF THE INVENTION

A picker for data cartridges has a sleeve for transporting cartridges, a thumb that is moveable relative to the sleeve and a single finger attached to the thumb. The single finger has an inboard pivot point which results in a self locking action (pulling makes the finger grip tighter), which does not rely on a strong return spring to provide locking force. The finger has an armed state for gripping and a splayed state for release. Switching between states is passive, depending only on one dimensional motion of the thumb relative to the sleeve. The finger has a post that travels in tracks in the sleeve. Switching tracks switches finger states. A spring loaded gate in the tracks enables track switching. Passive gripping and release eliminates the need for multiple drive units or clutch devices for performing the multiple functions of cartridge gripping, cartridge displacement and cartridge release. Potential cartridge wear and binding problems during extraction are eliminated by providing a sleeve guide that limits cartridge rotation, by providing a concave guide surface in storage locations that does not contact the cartridge during the limited rotation, and by proper selection of materials. A corresponding drive has a handle that must be manipulated. The thumb includes details for manipulating the drive handle.

BRIEF DESCRIPTION OF THE DRAWINGS

FIG. 1 is a simplified perspective view of portions of a computer information storage library.

FIG. 2A is a simplified top view of a rigid bar with an off center force pulling the bar from a tray.

DETAILED DESCRIPTION OF THE PREFERRED EMBODIMENT OF THE INVENTION

FIG. 1 is a simplified illustration of a computer information storage library, in which the picker of the invention can be used. The library illustrated in FIG. 1 has two drive mechanisms, 100 and 102, mounted in the base of a cabinet (not illustrated). At least one column of cartridge storage locations 104 above the drives is used to store data cartridges. A compact example embodiment of a library using the picker of the invention may have only one column of storage locations and a larger embodiment may have three or more columns. The storage locations 104 may be defined, for example, by "C" shaped brackets as illustrated, "L" shaped brackets, edge guides, or other suitable holders. Preferably, the storage locations 104 include features to prevent cartridges from vibrating or shaking out of the storage locations. The storage locations 104 may be fixed or may be implemented as removable magazines. A transport mechanism (not illustrated) provides horizontal (Y) and vertical (Z) displacement of a picker 106 and supports the picker 106 at a fixed orientation relative to the displacement path. Examples of suitable transport mechanisms for a computer information storage library configured as generally depicted in FIG. 1 may be found in U.S. Pat. Nos. 5,101,387, 5,043,962 and U.S. patent application Ser. No. 08/296,054. The picker 106 inserts a cartridge into a drive or storage location or extracts a cartridge from a drive or storage location. The picker 106 includes a sleeve for carrying a data cartridge (not illustrated in FIG. 1), a moveable thumb (not illustrated in FIG. 1) for displacement in the horizontal X direction, and a finger attached to the thumb.

Figure 2B:
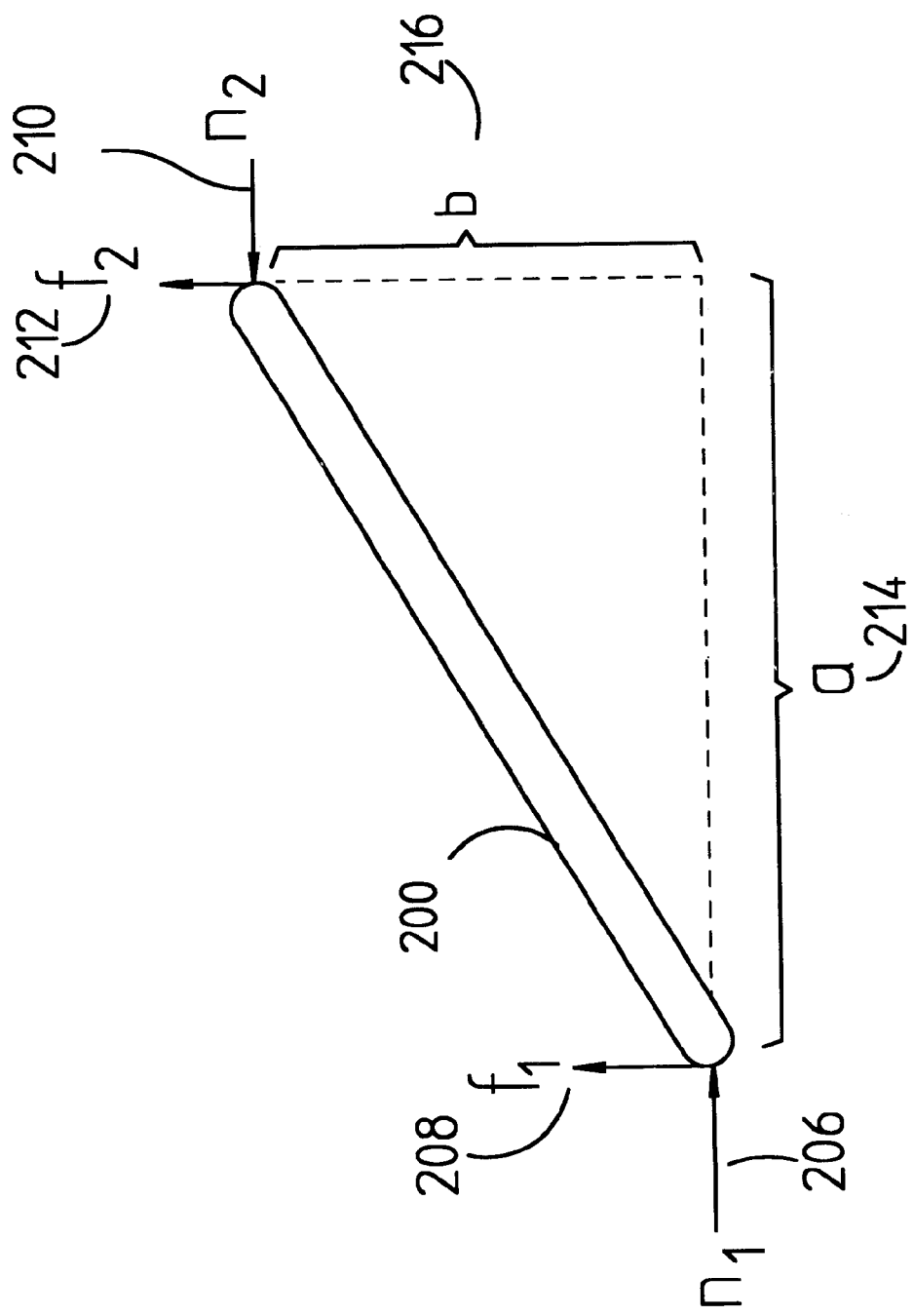
FIG. 2B is the bar of FIG. 2A illustrating forces on the ends of the bars and definitions of some distances of interest.

FIG. 2A illustrates a bar 200 being pulled by an offset force 204 from a tray 202. FIG. 2B illustrates forces from the tray 202 onto the ends of the bar 200. Since the force 204 is offset, the bar tends to rotate clockwise. As a result of the rotation force, the tray presses against the ends of the bar 200 with 2 forces that are normal to the walls, n1 (206) and n2 (210). The bar 200 has a coefficient of friction $\mu$ for sliding on the walls of the tray 202. The coefficient of friction times the normal forces results in friction forces parallel to the walls, f1 (208) and f2 (212). Dimensions "a" (214) and "b" (216) are perpendicular sides of a triangle with the hypotenuse formed by the rod 200. When $b/a<\mu$, the friction forces f1 and f2 exceed the pulling force 204 and bar 200 binds. Increasing the pulling force 204 results in increased binding force and the force 204 cannot pull the bar 200 from the tray 202.

Figure 2C:
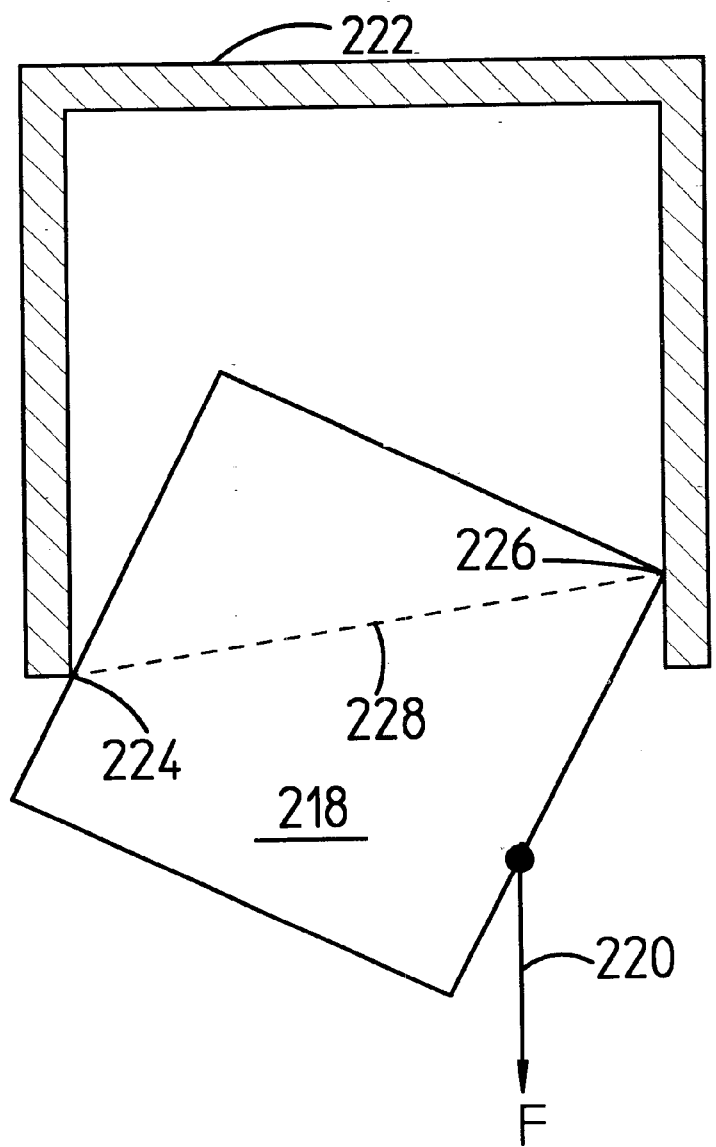
FIG. 2C is a top view of a cartridge being pulled from a storage location, with a potential binding situation as illustrated by the bar of FIG. 2A.

FIG. 2C illustrates a cartridge 218 being pulled by an offset force 220 from a storage location 222. If one side of the cartridge 218 rotates around one tray corner 224, a corner 226 of the cartridge may contact a wall of the storage location 222. If the cartridge is permitted to rotate far enough, the resulting large friction force may generate debris due to rubbing of the data cartridge case and the storage location guide (and any debris is undesirable on any computer information storage media or mechanisms) or the data cartridge may completely bind, as illustrated by the bar 200 in FIG. 2A. In FIG. 2C, dashed line 228 is equivalent to the bar 200 of FIG. 2A.

Figure 2D:
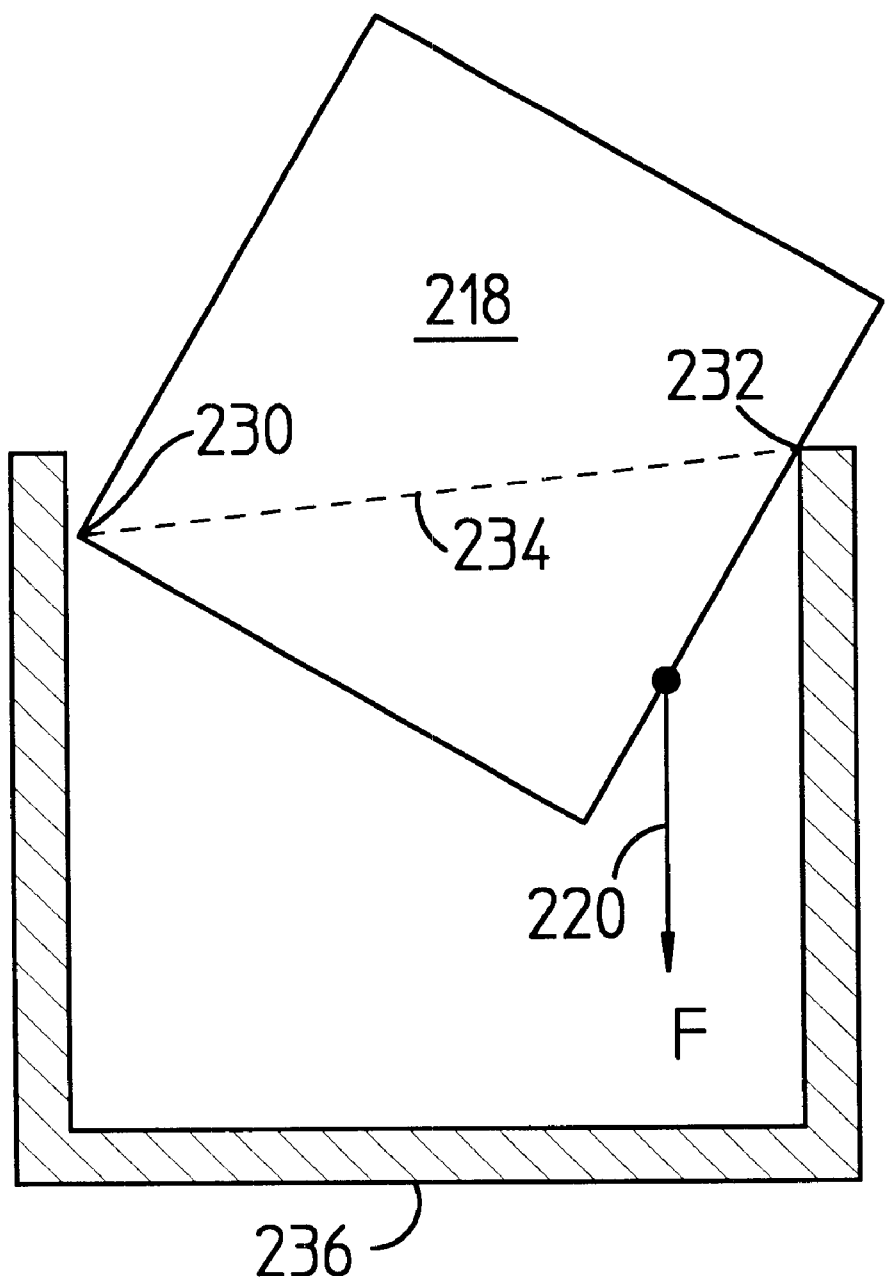
FIG. 2D is a top view of a cartridge being pulled into a picker sleeve, with a potential binding situation as illustrated by the bar of FIG. 2A.

FIG. 2D illustrates the cartridge 218 being pulled into a picker sleeve 236. If the cartridge rotates around one corner 230, and rubs at sleeve corner 232, the resulting large friction force may generate debris due to rubbing of the data cartridge case and the picker sleeve or the data cartridge may completely bind. In FIG. 2D, dashed line 234 is equivalent to the bar 200 of FIG. 2A.

Figure 3A:
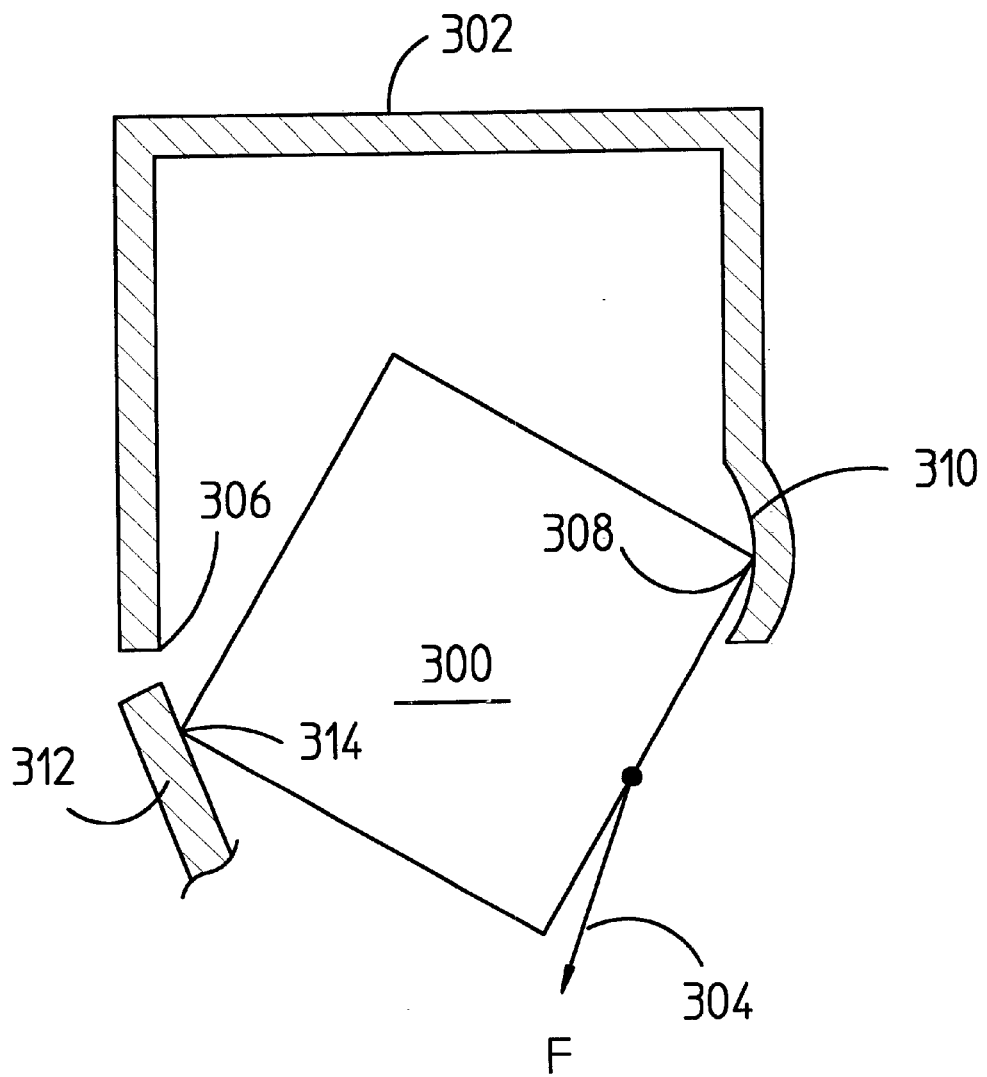
FIG. 3A is a simplified top view of a data cartridge being pulled from a storage location, along with side walls of the storage location and part of a picker sleeve.
Figure 3B:
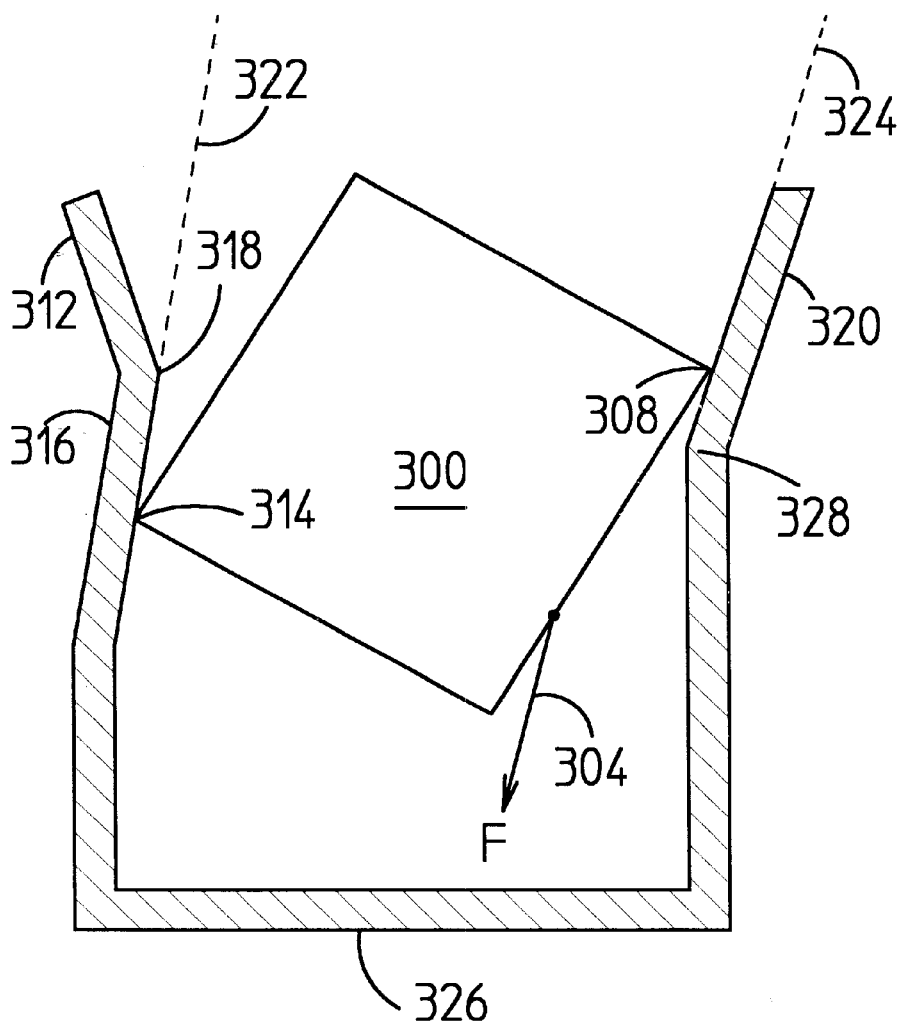
FIG. 3B is a simplified top view of the data cartridge of FIG. 3A being pulled further into the picker sleeve.

In the example embodiment of the invention, rubbing debris and the tendency to bind are greatly reduced by three design factors, as illustrated in FIGS. 3A and 3B. First, the picker and storage location guides are molded of a low-friction, low-wear polycarbonate/Teflon material, reducing debris and the coefficient of friction. Second, during extraction from a storage location, one guide wall of the picker sleeve extends almost to the guide of the storage location. As the data cartridge is extracted, the data cartridge does not pivot around the storage location guide as in point 224 of FIG. 2C, but instead one corner of the cartridge contacts a lead-in portion of the picker sleeve. Referring back to FIGS. 2A and 2B, this keeps distance "b" (216) greater than $a*\mu$, resulting in a small normal force at point 308 and point 314 of FIG. 3A. Third, the guide walls of the picker sleeve are designed to prevent rotation of a cartridge around a sleeve corner as depicted in FIG. 2D.

In FIG. 3A, a cartridge 300 is being pulled by an offset force 304 from a storage location 302, as in FIG. 2C. However, in the embodiment illustrated in FIG. 3A, the picker sleeve has a long slanting lead-in 312 that prevents the cartridge wall from touching and rotating around storage location corner 306. In addition, a curve 310 in the opposite side of the storage location further ensures that the cartridge is pulled away from corner 306. Cartridge corner 314 then slides along the sleeve lead-in 312 without binding. As an alternative, a roller may be placed at corner 306. With a roller, the friction is so low that force f1 (208) in FIG. 2B is insufficient to cause binding.

Figure 4:
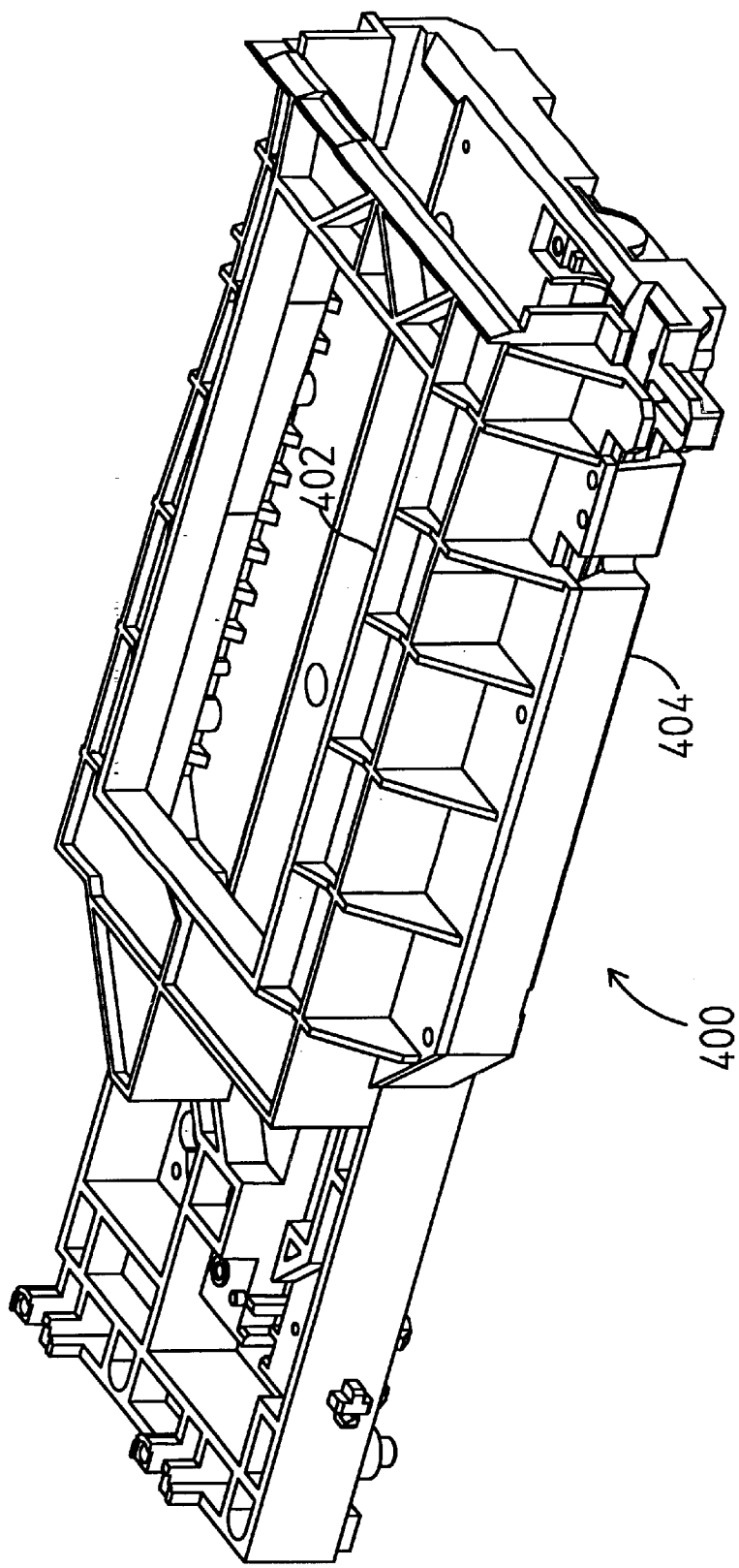
FIG. 4 is a perspective view of the picker sleeve.
Figure 5:
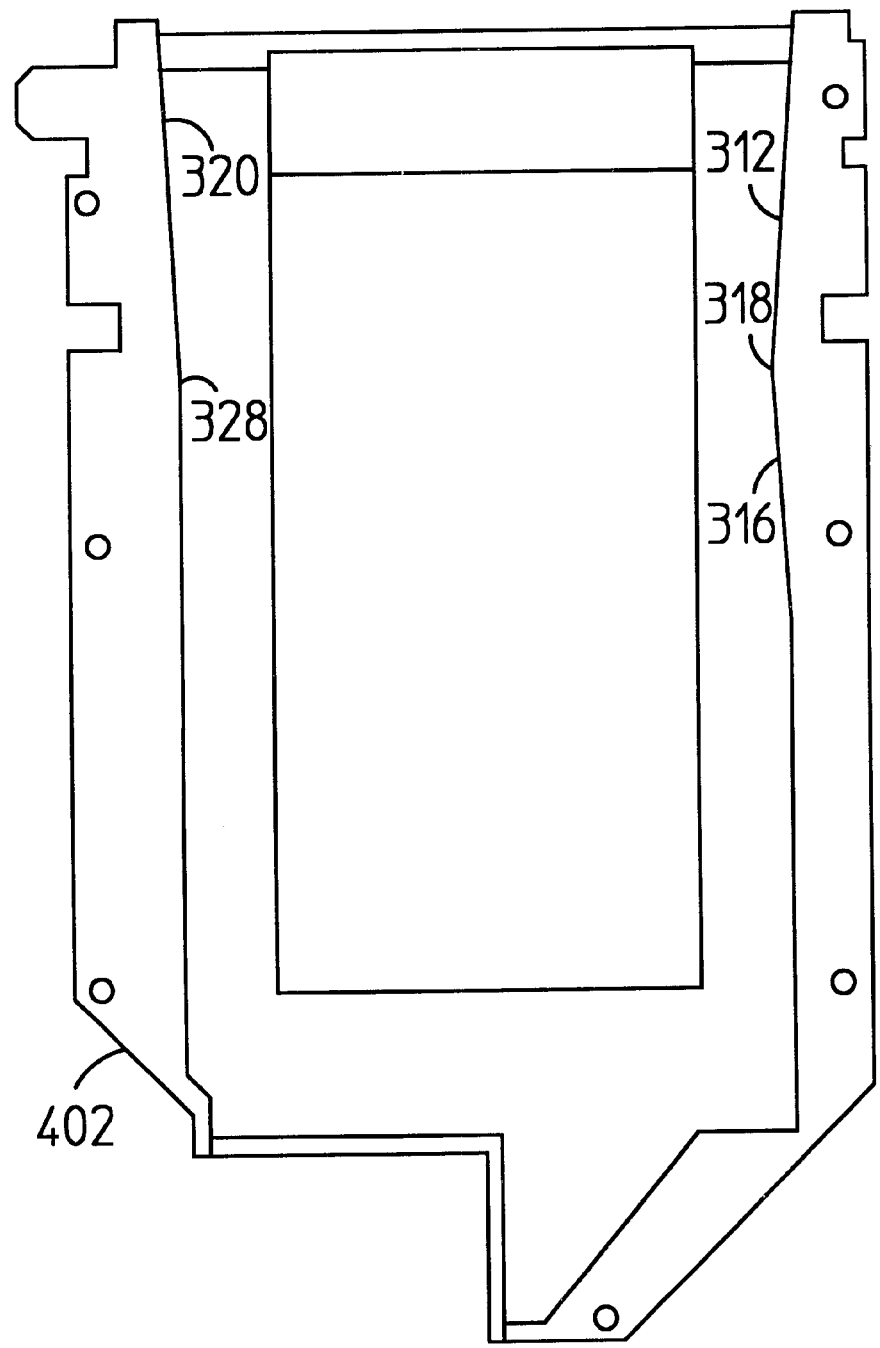
FIG. 5 is a bottom view of the top part of the picker sleeve of FIG. 4.

FIG. 3B illustrates the cartridge 300 being pulled further into a picker sleeve 326 (to facilitate illustration, sleeve 326 depicted in FIG. 3B is just the guide part of a sleeve which is illustrated in further detail in FIGS. 4 and 5). The opposite side wall of the picker sleeve from lead-in section 312 also has a lead-in section 320, preventing the rotation situation depicted by point 232 in FIG. 2D. In addition, the side wall of the picker sleeve having lead-in 312 has a second angular section 316 angling outward. Section 316 and section 320 are parallel and separated by a distance greater than the cartridge width, as depicted by dashed lines 322 and 324, ensuring that the cartridge side wall does not contact and rotate around corner 318. Cartridge corner 314 slides past corner 318 and along section 316 without binding.

Figure 3C:
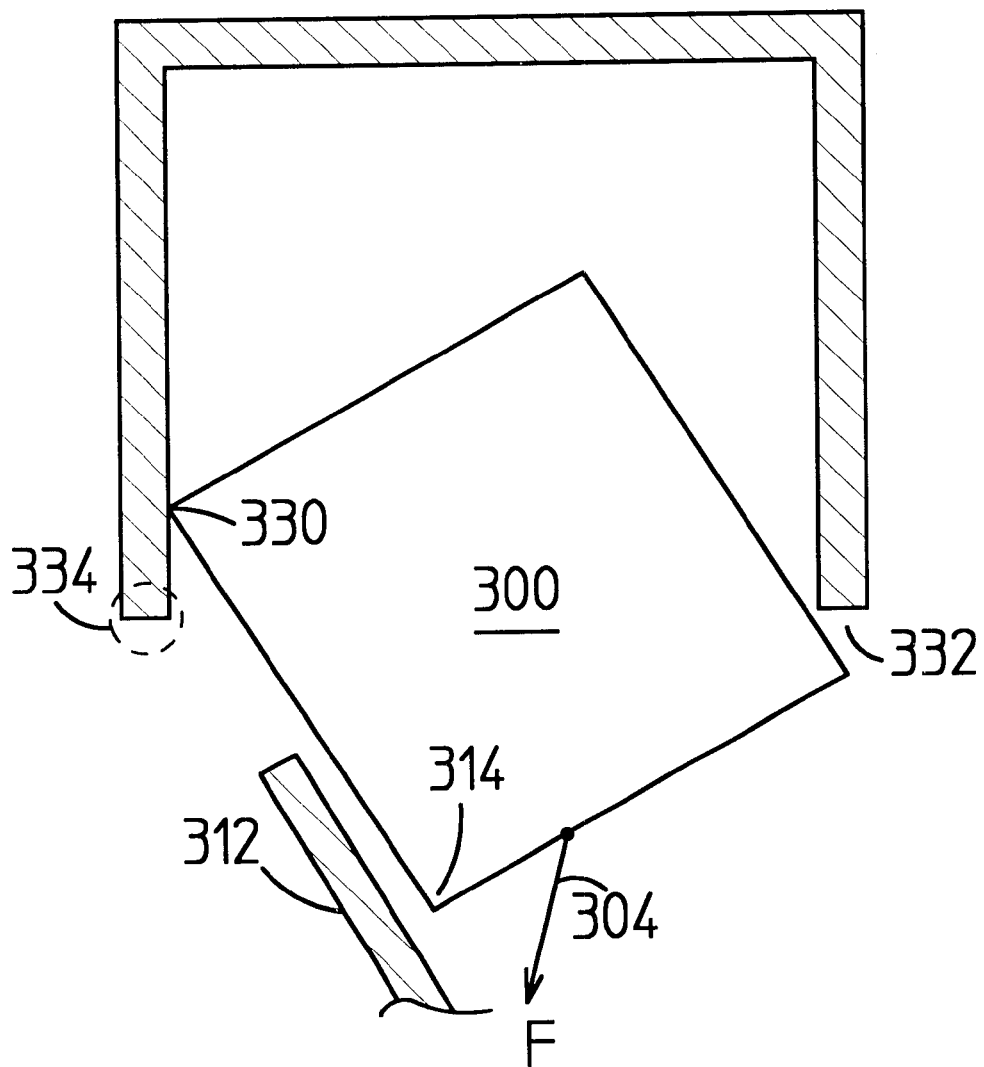
FIG. 3C is a simplified top view of the data cartridge of FIG. 3A being extracted from a drive.

FIG. 3C illustrates a cartridge being extracted from a drive. In a specific embodiment of the invention using tape drives from Quantum Corporation, the interior guides in the drives have not been modified to provide a curved section as illustrated by curve 310 in FIG. 3A for storage location guides. To prevent binding of a tape cartridge being extracted from a drive, the cartridge is first pulled slightly out of the drive far enough to ensure that it protrudes into the picker sleeve 326. Then, the picker sleeve 326 is translated to the right (as viewed in FIG. 3C), forcing the cartridge to rotate counterclockwise (as viewed in FIG. 3C) sufficient to ensure that cartridge corner 330 slides on the guide in the drive, therefore ensuring that the cartridge cannot contact the drive bezel corner 334. For part of the travel during extraction from a drive, the cartridge may touch at three points: first, cartridge corner 330 on one guide within the drive; second, along a cartridge side at drive bezel corner 332; and third, cartridge corner 314 on picker sleeve lead-in 312. Section 312 of the picker sleeve is slightly moveable (spring loaded) so that cartridge corner 314 does not bind on section 312.

As an alternative, for cartridge extraction from a drive, a roller may be placed in a drive bezel, at corner 334, as depicted by the dashed circle in FIG. 3C. Again, with a roller, the friction is so low that force f1 (208) in FIG. 2B is insufficient to cause binding.

Referring again to FIG. 3B, when a cartridge is being pushed out of the picker sleeve 326, guide points 318 and 328 provide a relatively narrow waist to provide initial guidance of the cartridge as the cartridge is pushed outward. When the cartridge clears the waist defined by points 318 and 328, it is then guided by a storage location or drive. The diverging lead-ins 312 and 320 then permit the cartridge to rotate or translate slightly as required by the storage guides or drive, without constraining or placing excessive force on the cartridge by the picker sleeve guide sections 312 and 320. The length of the picker sleeve guide sections 312 and 320 is almost the length of a data cartridge, to ensure unconstrained insertion.

As discussed in conjunction with FIG. 1, picker 106 includes a sleeve for transporting a cartridge, a thumb, and a finger on the thumb. FIG. 4 illustrates the picker sleeve 400, with an upper section 402 and a lower section 404. FIG. 5 is a bottom view of the upper section 402 of the sleeve 400, illustrating the side wall guide sections 312, 316 and 320 illustrated in FIGS. 3A and 3B.

Figure 6:
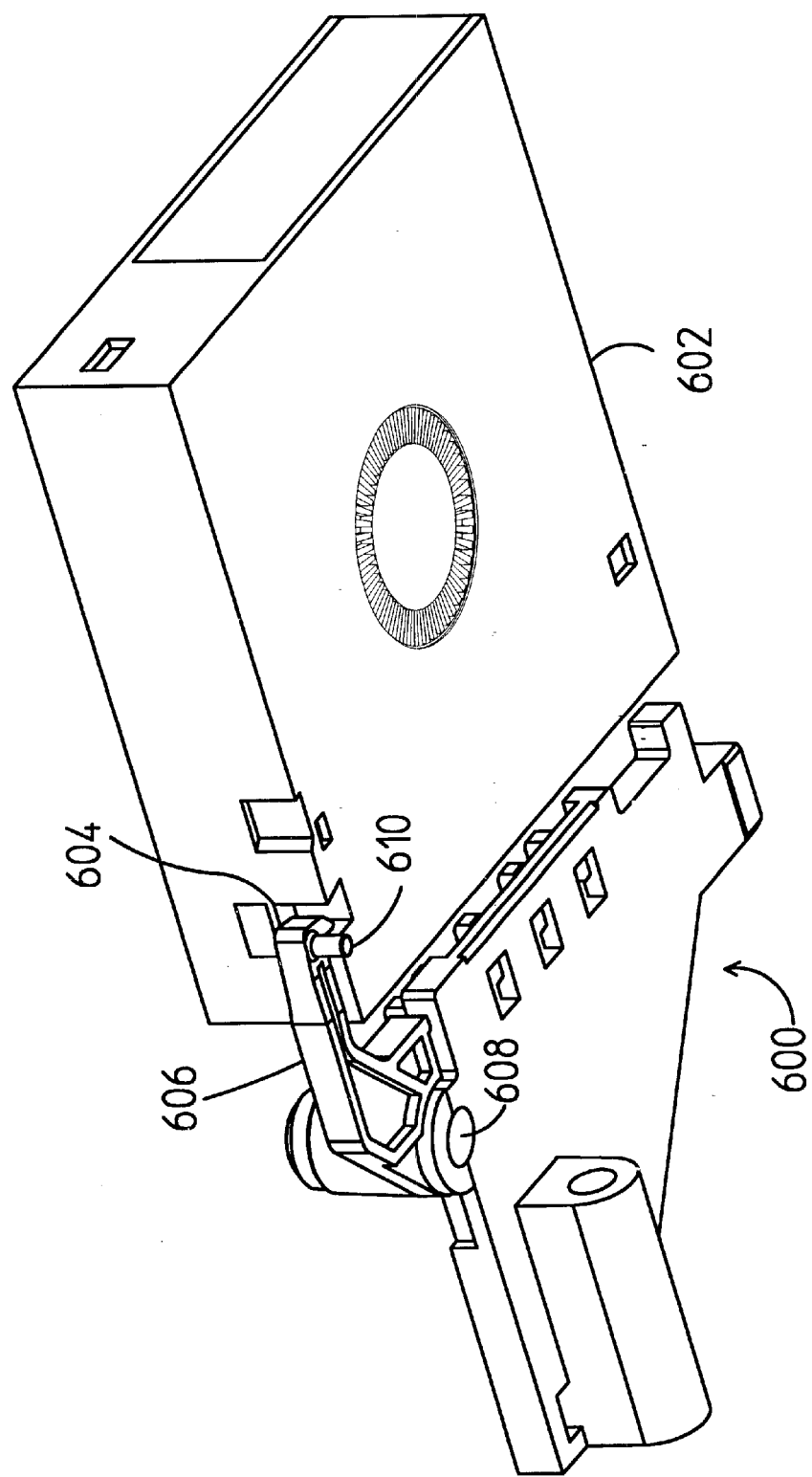
FIG. 6 is a bottom perspective view of a cartridge along with a thumb and finger.

FIG. 6 is a bottom perspective view of the thumb 600 and a DLT tape cartridge 602. The tape cartridge 602 includes a notch 604 in one side that may be used for extraction. The thumb 600 has a single pivoting finger 606 for engaging notch 604. The finger 606 rotates around a pivot point 608. Finger 606 includes a post 610. Post 610 travels in a guide in the lower sleeve 404, as discussed below in conjunction with the discussion of FIGS. 8 and 9.

Figure 7:
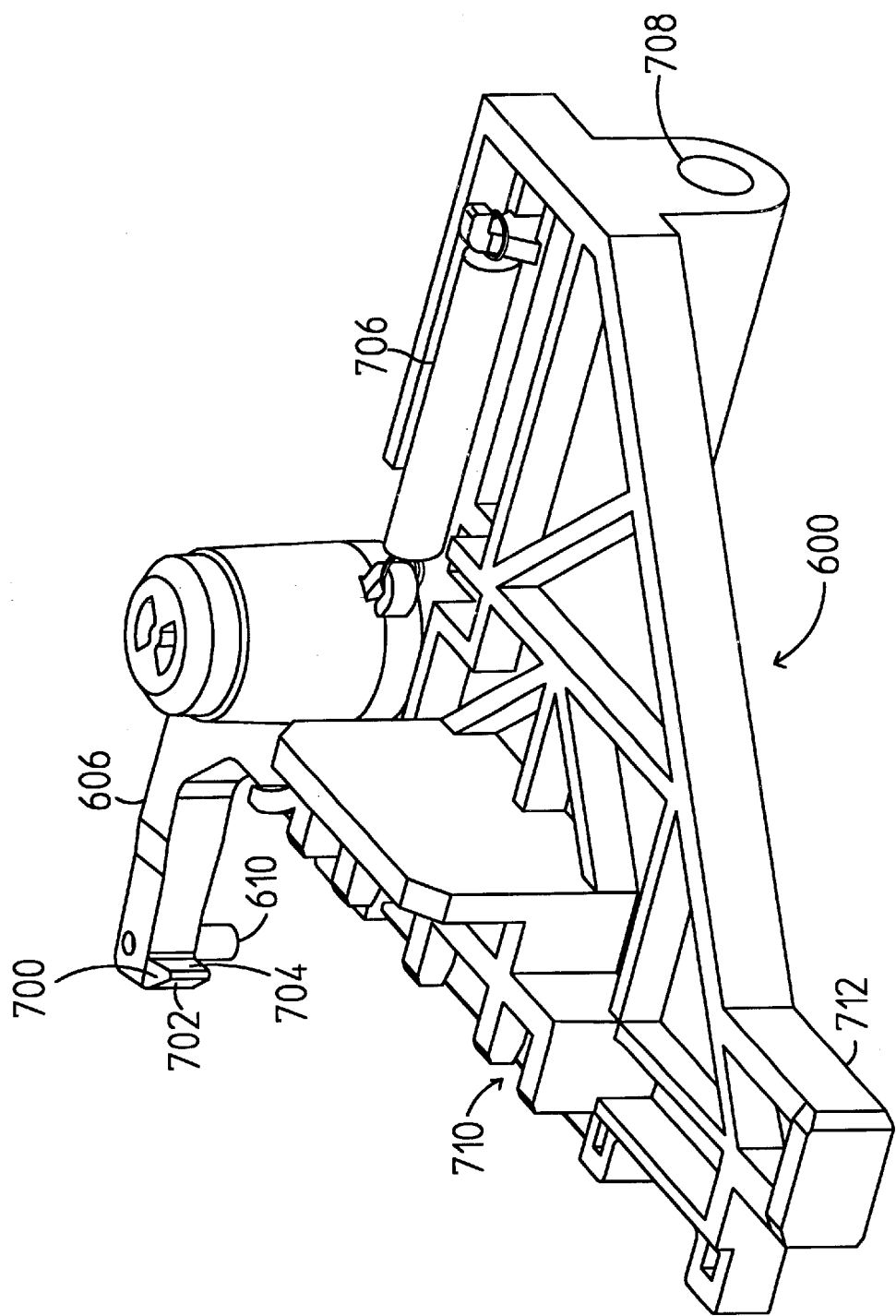
FIG. 7 is a top perspective view of the thumb and finger of FIG. 6.

FIG. 7 is a top perspective view of the thumb 600. The finger 606 has a hook 700 that engages the notch 604 (FIG. 6) in the data cartridge. A spring 706 pulls the finger 606 inward around the pivot point 608 (FIG. 6). The finger 606 must engage the hook 700 into the notch 604 with sufficient locking force to extract the cartridge 602 from storage locations and drives. The spring 706 provides sufficient force to rotate the hook 700 into the notch 604 but does not provide a substantial gripping force. The pivot point 608 is inside the grip point, so that a pulling force on the picker results in a rotational force at the hook 700, forcing the hook 700 to rotate inward around the pivot point 608, which in turn makes the finger 606 grip tighter. Therefore, increased pulling force on the thumb 600 results in increased normal gripping force on the cartridge, providing self-locking. In addition, with the pivot point 608 inside the grip point, when the finger 606 is pushed outward towards a cartridge, contact with the cartridge rotates the hook 700 outward, enabling the hook 700 to slide across the front of the cartridge and down the side of the cartridge and eventually into the notch 604 of the cartridge. A forward beveled surface 702 on the hook 700 facilitates pushing the hook 700 around the front of the cartridge and helps to deflect the finger outward. The hook 700 also has a rearward laterally extending surface 704 that engages a corresponding surface in the cartridge notch 604 during extraction of the cartridge.

The thumb 600 includes an integrally molded lead screw nut 708. The molded lead screw nut provides cost savings, better referencing, ease of assembly, and high reliability through parts reduction. The picker also includes an integral sliding outrigger 712 that provides antirotation control without adding an additional part. In addition, the picker includes thumb features 710 that serve as a thumb for pushing a cartridge and also enable the picker to manipulate a drive handle, as discussed below in conjunction with discussion of FIGS. 13A and 13B. The thumb 600 is molded of a low friction, low wear Nylon/Teflon material for long life, low wear and low debris generation.

Figure 8:
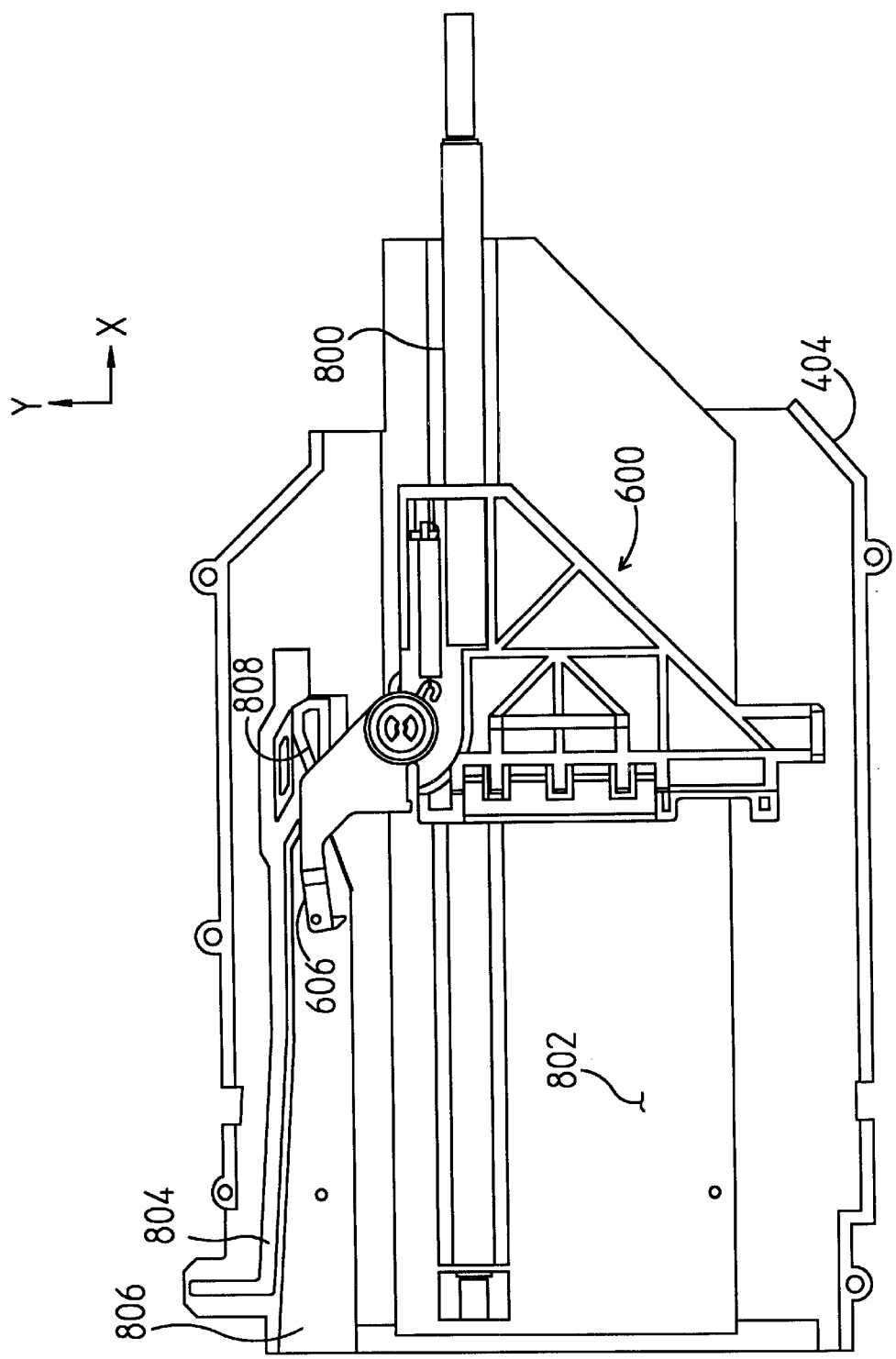
FIG. 8 is a top view of the lower part of the sleeve of FIG. 4 along with the thumb and finger of FIG. 6.

FIG. 8 is a top view of the lower section 404 of the picker sleeve. A lead screw 800, in conjunction with the integral follower nut 708 (FIG. 7) on the thumb provides motion of the thumb 600 in the X dimension relative to the sleeve 400. The motor for the lead screw is not illustrated, but a suitable arrangement may be seen in U.S. Pat. No. 5,014,255 (Wanger et al). A cartridge may be pulled into the sleeve into the area generally depicted by reference number 802 for transport. The lower sleeve 404 also includes tracks for guiding the finger post 610 (FIG. 6). There is an outer track 804 and an inner track 806. These tracks in conjunction with the finger post 610 provide passive actuation and release. The finger 606 has two states. The first finger state is an armed state, in which the finger post 610 is in the inner track 806 and in which the spring force pulls the finger inward to engage the cartridge notch 604. The second finger state is a splayed state in which the finger post 610 is in the outer track 804 for cartridge release. Switching between states is accomplished through motion of the thumb in the X dimension only. Diversion of the finger post 610 from one track to another is controlled by a one-way gate 808. The one-way gate 808 leverages a concept from Wanger et al. However, in Wanger et al, a cartridge must be present to select the splayed state. That is, in Wanger et al, diversion into a track for splaying requires having a cartridge present to hold two fingers apart. In the picker illustrated in FIGS. 8 and 9, track switching depends only on X dimension motion and no cartridge is necessary.

Figure 9:
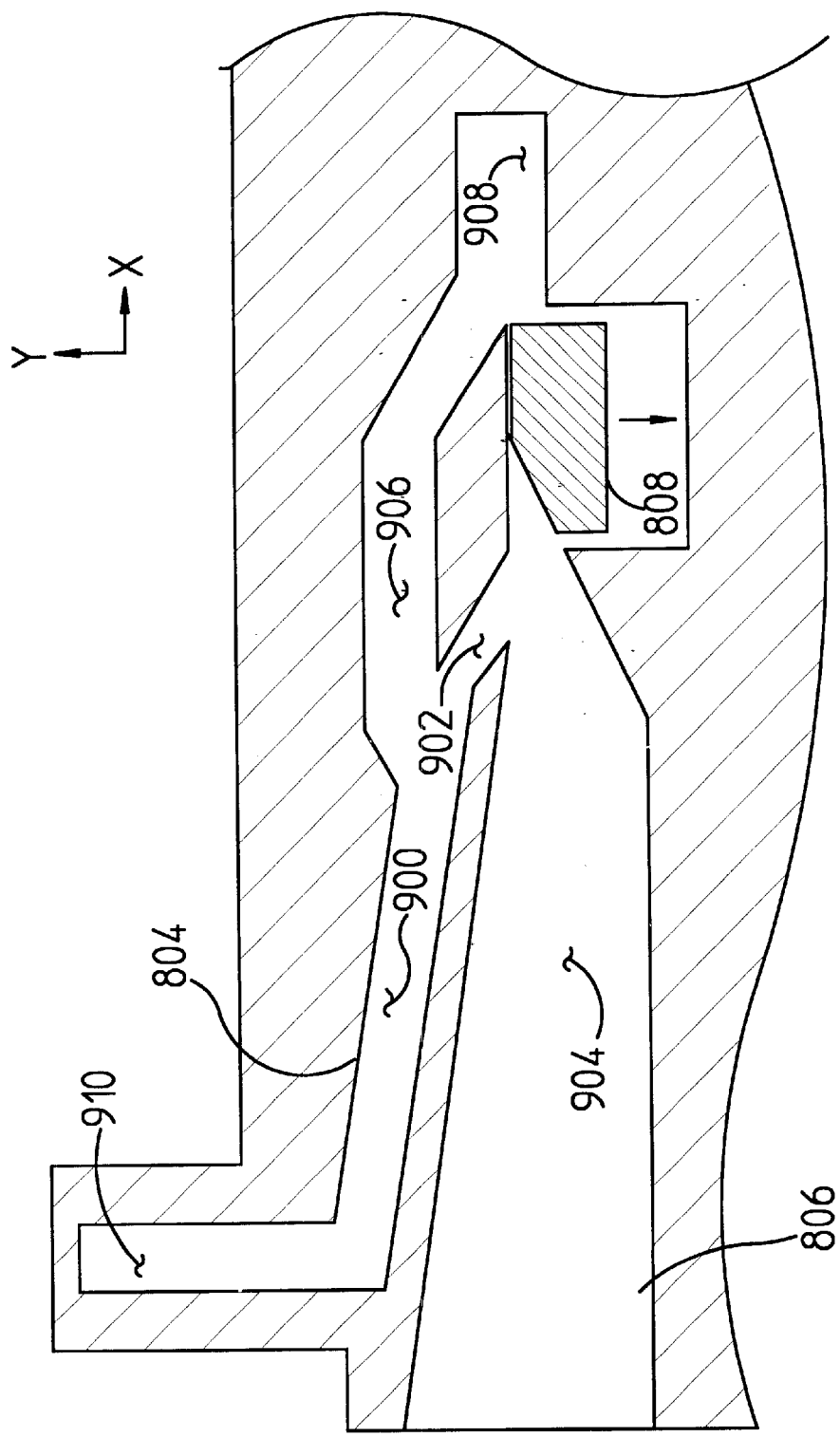
FIG. 9 is a top view of tracks in the lower part of the sleeve.

FIG. 9 illustrates the tracks 804 and 806 and the gate 808 in the lower sleeve 404. When the finger post is initially in region 904 (the armed state), and the thumb is pulled into the picker sleeve, the finger post can be pulled past the spring loaded gate 808 (deflecting gate 808 in the direction shown by the arrow) into track region 908. When the thumb is then moved outward from the picker sleeve, the finger post is forced through track region 906 to track region 900 and the finger is then in the splayed state. Therefore, to switch from an armed state to a splayed state, the thumb is simply pulled into the picker sleeve in the X dimension to its limit. When the finger post is initially in track region 900 (the splayed state), and the thumb is pulled into the picker sleeve, the spring bias on the finger (FIG. 7, 706) causes the finger post to travel through track region 902. At that point, the finger can be routed into track region 904 (armed state) by pushing the thumb outward, or the finger can be returned to track region 900 (splayed state) by pulling the thumb further inward, past the gate 808 into track region 908, and then outward through track region 906 to track region 900. From FIG. 9, it can been seen that the splay/arm states are selected by motion of the thumb in the X dimension only. In addition, the split finger track design enables an error recovery routine to regrip a cartridge while the cartridge is inside the picker sleeve. For example, a cartridge is typically inserted while the picker finger is splayed. If the cartridge fails to insert properly so that the cartridge is still partially in the picker sleeve, the thumb is pulled into the picker sleeve to arm the finger as discussed above and then the cartridge is regripped so that the cartridge can be pulled fully back into the picker sleeve.

When the picker 106 (FIG. 1) is manipulating the drive handle, the finger 606 needs to be completely out of the way. In FIG. 9, to move the finger completely out of the way, the finger post is moved outward from the picker sleeve to the end of track region 900. As discussed above, because the pivot point 608 is inside the grip point, if the finger 606 is blocked, such as by a drive or cartridge, moving the thumb outward cause the finger 606 to rotate, causing the post 610 to move to the end of track region 910. This locks the finger 606 in an out of the way position.

Figure 10:
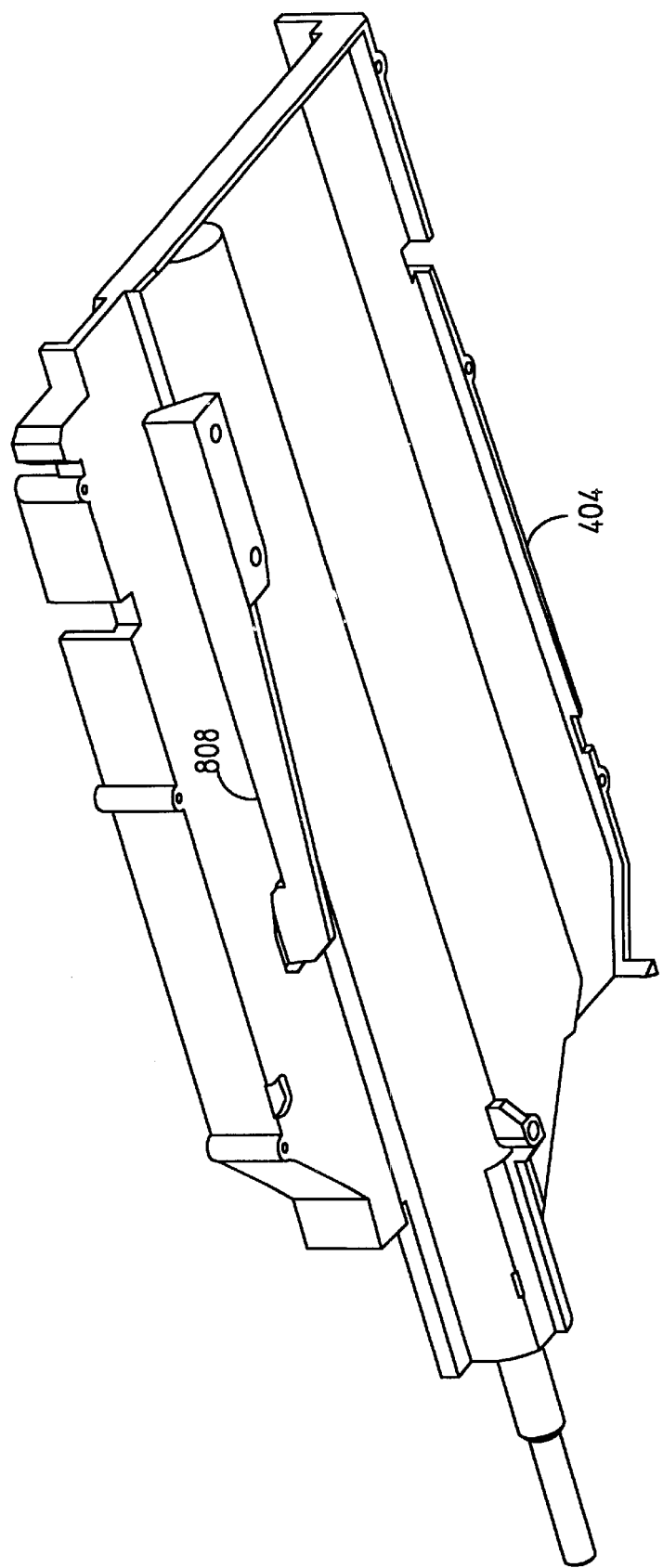
FIG. 10 is a bottom perspective view of the lower part of the sleeve illustrating a spring loaded gate.

FIG. 10 shows the bottom of the lower picker sleeve 404, illustrating the spring loaded gate 808 from below. In the embodiment illustrated in FIG. 10, the gate 808 is molded plastic, with one end rigidly mounted towards the front of the lower picker sleeve 404, and forming a cantilevered leaf spring with the moveable end of the spring passing through an opening in the lower picker sleeve 404 to provide the gate function illustrated in FIG. 9.

Figure 11:
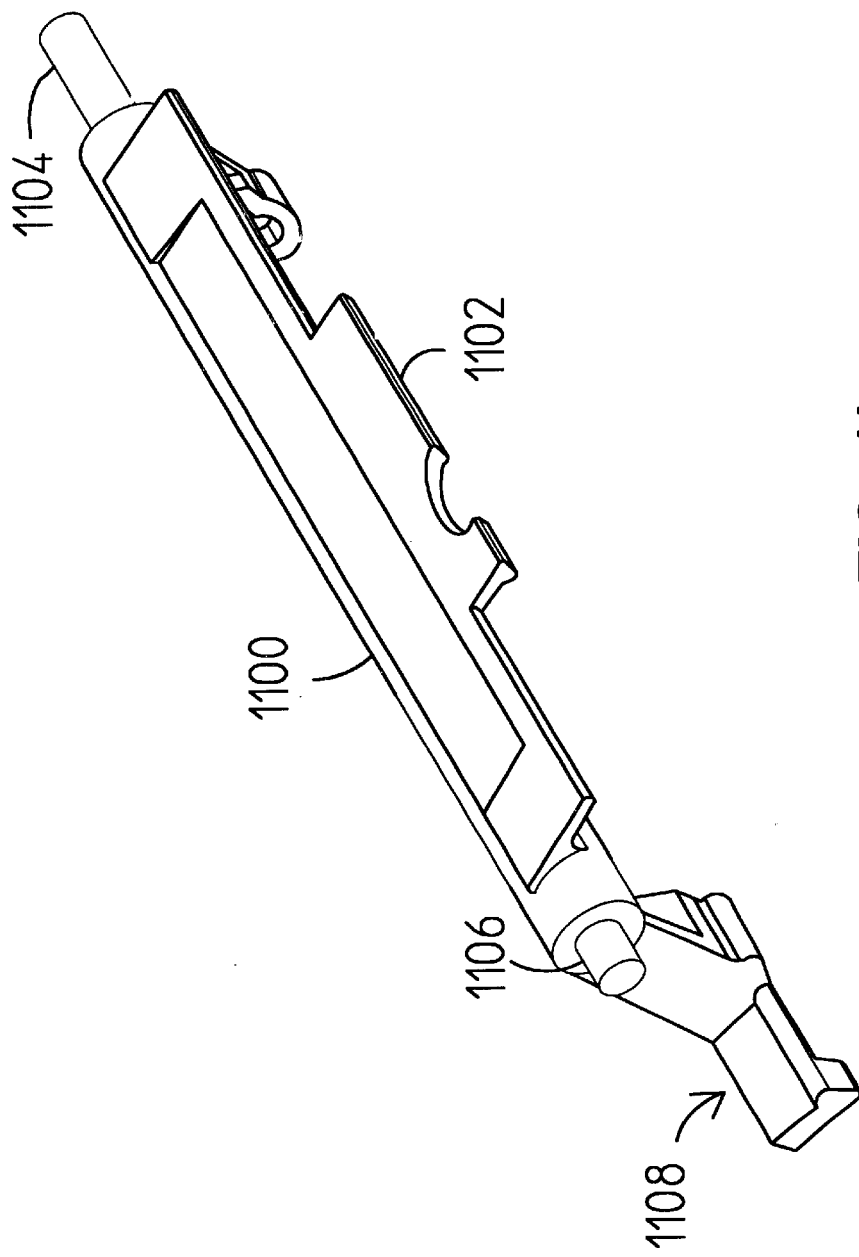
FIG. 11 is a perspective view of a custom drive handle.

As discussed above, drives for DLT cartridges have a handle, with an optional powered actuator for the handle. In a specific library implementation using the single finger picker, the standard drive handle is replaced with a unique custom handle and bezel suitable for actuation by the picker. Using the picker for handle actuation enables drive cost and space reduction by eliminating the power actuator (typically for multiple drives). FIG. 11 is a perspective view of the custom handle 1100. An extension 1102 barely protrudes beyond the front of the bezel when the handle 1100 is a raised position, enabling the picker to pass close to the front of the drives regardless of the handle position. Hinges 1104 and 1106 mate with corresponding surfaces in the drive and the structure generally indicated by reference number 1108 is compatible with the standard drive handle.

Figure 12:
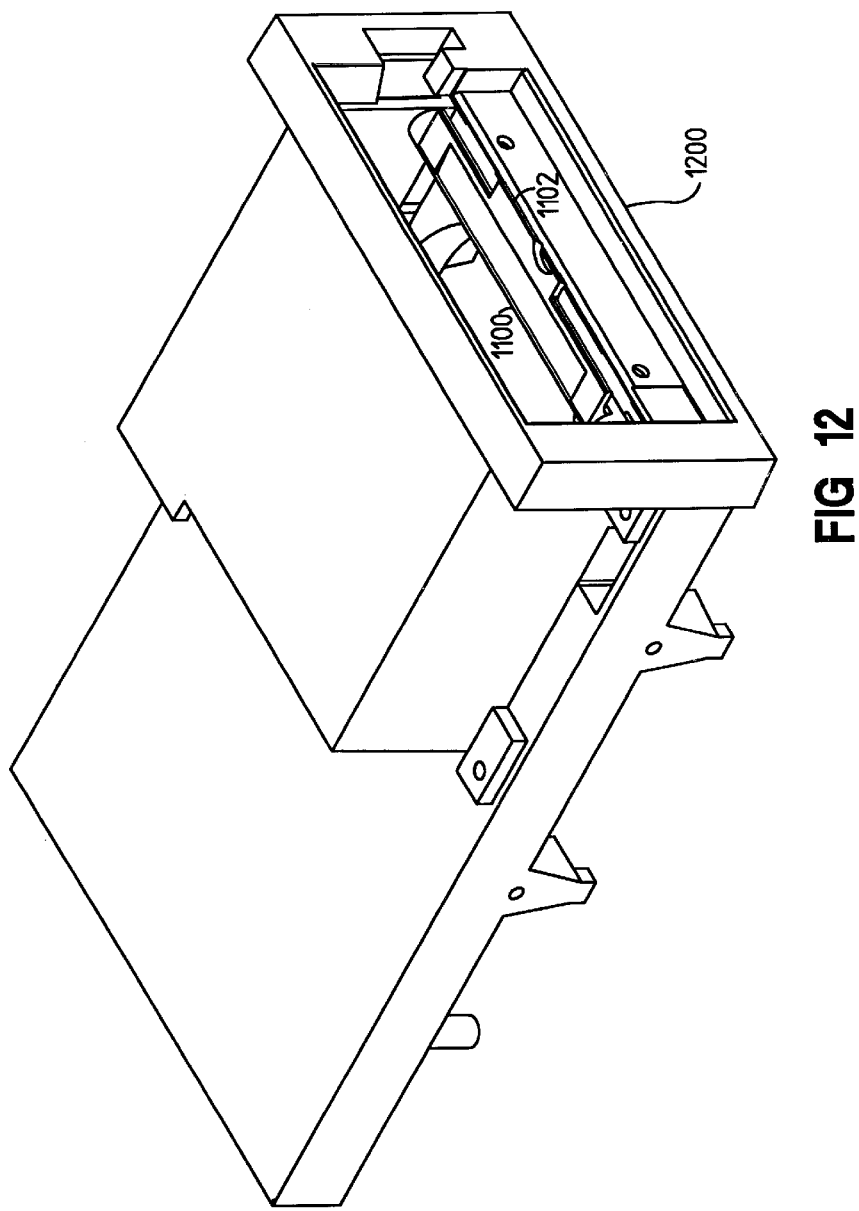
FIG. 12 is a perspective view of the front of a drive illustrating a custom drive bezel and the drive handle.

FIG. 12 illustrates the custom drive bezel 1200. In FIG. 12, the custom handle 1100 is illustrated mounted into a tape drive. Note that a tape cartridge is inserted into the drive through an opening above the handle 1100.

Figure 13A:
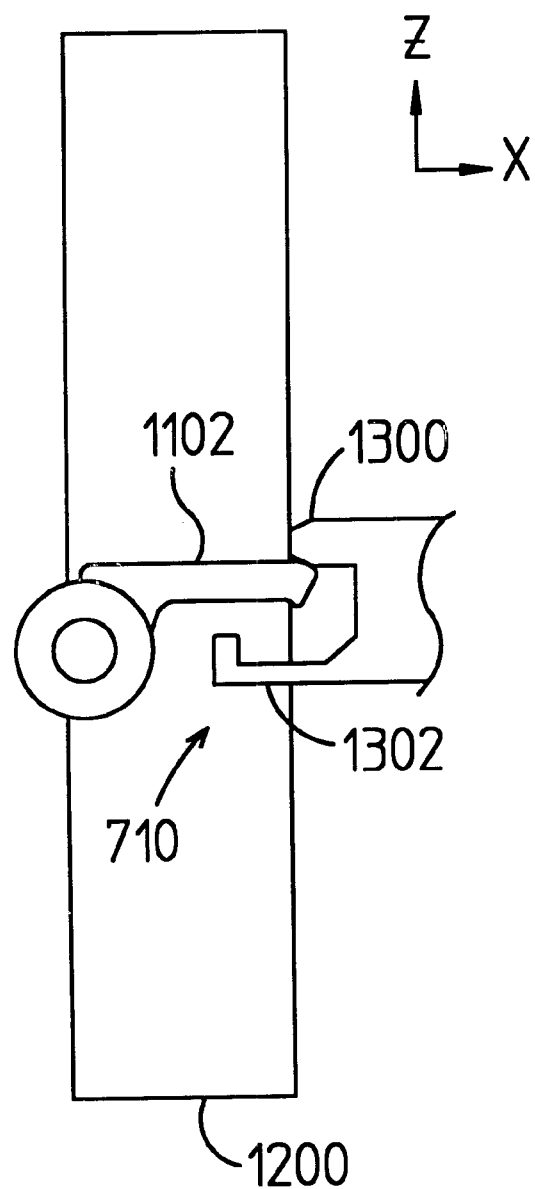
FIG. 13A is a simplified cut away side view of a drive bezel, drive handle and the thumb of the picker, with the drive handle in a raised (unlatched) position.

FIG. 13A is a simplified cut away side view of the drive bezel 1200, the drive handle extension 1102 and the thumb features 710 on the thumb. The thumb has upper extensions 1300 and lower extensions 1302. When the picker is driven towards the bezel 1200, so that the upper extensions 1300 are aligned in the X dimension with the front surface of the bezel, the thumb features 710 are appropriately positioned in the X dimension to engage the extension 1102 on the handle. In FIG. 13A, the drive handle is in a raised (unlatched) position and the upper extensions 1300 are in a position to push the handle down into a latched position. The handle is latched by translating the picker downward (Z-dimension).

Figure 13B:
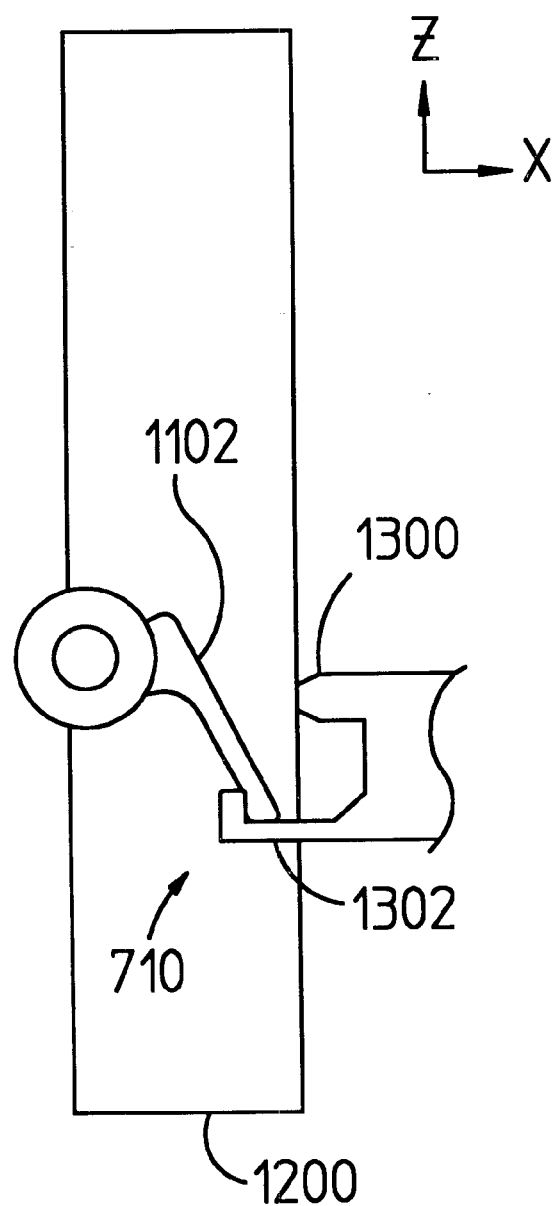
FIG. 13B is a cut away side view as in FIG. 13A with the drive handle in a lowered (latched) position.

FIG. 13B is a cut away side view of the bezel 1200, the drive handle extension 1102 and the thumb features 710 on the thumb, with the drive handle in a lowered (latched) position. Again, when the picker is driven towards the bezel 1200, so that the upper extensions 1300 are aligned in the X dimension with the front surface of the bezel, the thumb features 710 are appropriately positioned in the X dimension to engage the extension 1102 on the handle. In FIG. 13B, the lower extensions 1302 are positioned to raise the handle into an unlatched position. The handle is unlatched by pulling the thumb back (X-dimension) and translating the picker upward (Z-dimension) simultaneously.

Note also in FIG. 13B that when the handle is in a latched position, the handle extension 1102 extends slightly outward towards the front of the bezel 1200, so that vertical force by the picker as in FIG. 13B tends to rotate the handle counterclockwise (as viewed in FIG. 13B). In addition, when manipulating the handle, the handle is in contact with either the upper or lower thumb extensions (1300 and 1302), preventing the handle from snapping into either the extreme latched or unlatched positions, thereby providing a smooth operation of the handle.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A picker for extracting a data cartridge from a storage location, comprising:

a sleeve;

a thumb, adapted for movement relative to the sleeve;

a finger mounted on the thumb;

a post on the finger;

a first track in the sleeve, the first track adapted to receive the post, wherein when the post is in the first track, the finger is positioned to grip the data cartridge;

a second track in the sleeve, the second track adapted to receive the post, wherein when the post is in the second track, the finger is positioned to release the data cartridge; and a gate, spring loaded between the first track and the second track, wherein when the post is in the first track and the thumb is moved to a first predetermined position, the post deflects the gate, enabling the post to move past the gate into the second track, even when no data cartridge is being gripped.

2. The picker of claim 1, further comprising:

a connecting track between the first track and the second track, wherein when the post is in the second track and the thumb is moved to a second predetermined position, the post is guided along the connecting track to the first track.

3. A picker for extracting a data cartridge from a storage location, the storage location having an end, the data cartridge having a side wall with an opening in the side wall, the picker comprising:

a sleeve;

a single finger, moveable relative to the sleeve, the finger having a tip and a hook surface on the tip, the hook surface on the tip adapted to engage the opening in the side wall of the data cartridge;

a first guide wall on the sleeve; and wherein when the cartridge is pulled away from the storage location by the finger, the first guide wall on the sleeve is positioned so that a corner of the data cartridge touches the first guide wall on the sleeve, limiting rotation of the data cartridge and preventing the data cartridge from pivoting around the end of the first storage location.

4. The picker of claim 3, the data cartridge having a width, the picker further comprising:

an inner section on the first guide wall;

a second guide wall on the sleeve;

the second guide wall parallel with the inner section on the first guide wall; and the second guide wall spaced from the inner section on the first guide wall by a distance greater than the width of the data cartridge.

5. The picker of claim 3 further comprising:

a post on the finger, the post extending toward the sleeve;

a first track in the sleeve, the first track adapted to receive the post, wherein when the post is in the first track, the finger is positioned to grip the data cartridge; and a second track in the sleeve, the second track adapted to receive the post, wherein when the post is in the second track, the finger is positioned to release the data cartridge.

6. The picker of claim 5, further comprising:

a thumb, adapted for movement relative to the sleeve, the finger mounted on the thumb;

a gate, spring loaded between the first track and the second track, wherein when the post is in the first track and the thumb is moved to a first predetermined position, the post is forced past the gate into the second track.

7. The picker of claim 6, further comprising:

a connecting track between the first track and the second track, wherein when the post is in the second track and the thumb is moved to a second predetermined position, the post is guided along the connecting track to the first track.

8. A picker for extracting a data cartridge from a drive mechanism, the drive mechanism including a handle, the picker comprising:

a thumb having a first extension and a second extension;

wherein when the thumb is positioned so that the handle is between the first extension and the second extension, the thumb is moved in a first direction causing the first extension to contact the handle and to move the handle from an unlatched position to a latched position or the thumb is moved in a second direction causing the second extension to contact the handle and to move the handle from the latched position to the unlatched position.

9. A picker for extracting a data cartridge from a storage location, comprising:

a sleeve;

a thumb, the thumb moveable within the sleeve, within a range of movement along a path, the range of movement having a first end and a second end;

wherein when the thumb is near the first end and when the cartridge is being gripped, the cartridge is fully within the sleeve;

wherein when the thumb is near the second end and when the cartridge is being gripped, the cartridge extends outside the sleeve;

a finger, mounted on the thumb, the finger having an armed state for gripping and a splayed state for release;

wherein when the finger is in the armed state, movement of the thumb along the path near the first end causes the finger to be switched to the splayed state; and wherein when the finger is in the splayed state, movement of the thumb along the path near the first end causes the finger to be switched to the armed state.

10. The picker of claim 9 further comprising:

the finger having a post;

the sleeve having a first track, adapted to guide the post, wherein when the post is in the first track the finger is in the armed state;

the sleeve having a second track, adapted to guide the post, wherein when the post is in the second track the finger is in the splayed state;

a connecting track connecting the first and second tracks;

a gate that is moveable, between the first and second tracks;

wherein when the post is in the first track, movement of the post in a first direction causes the post to deflect the gate and the post moves to the second track; and wherein when the post is in the second track, movement of the post in the first direction causes to post to pass through the connecting track to the first track.

* * * * *